Figure 1:
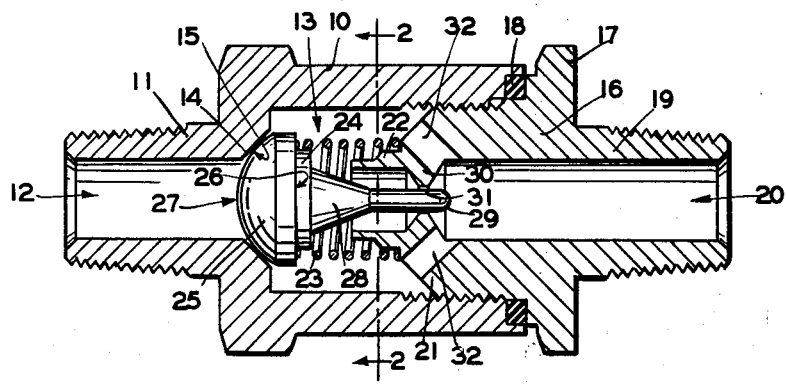

Oct. 20, 1959  H. O. DOBRICK  2,909,192
CHECK VALVE
Filed April 22, 1954

INVENTOR.
HERBERT O. DOBRICK
BY
ATTORNEY

United States Patent Office 2,909,192
Patented Oct. 20, 1959

2,909,192

CHECK VALVE

Herbert O. Dobrick, Maywood, N.J., assignor to Bendix Aviation Corporation, Teterboro, N.J., a corporation of Delaware Application April 22, 1954, Serial No. 424,957

1 Claim. (Cl. 137—542)

This invention relates to check valves. In valves of this type, when used with apparatus in which accurate control of fluid flow is important, it is essential that the valve should be entirely reliable in always opening at the proper pressure, and that it should not leak. The latter requirement imposes special difficulties when the conditions of use favor a metal-to-metal seating contact, which is necessary for certain uses. These conditions exist in systems which handle liquid oxygen or other low temperature fluids, and an apparatus that may be subjected to low temperatures, as in high-flying aircraft. In such systems ice may form in the passages, particularly at valve seats, preventing proper operation. In oxygen supply systems for aviators, for which this invention is especially adapted, such a failure can be dangerous.

An object of the invention is to provide a check valve whose construction minimizes the ability of ice, and especially ice formed in the seating zone, to interfere with proper operation of the valve. A more specific object is to accomplish this purpose with a check valve having a movable head with a stem, by providing an arrangement that substantially eliminates the tendency to stick, both at the seating zone of the head and at the stem, while maintaining effective seating and alignment.

A further object is to provide a self-aligning valve that will maintain an effective sealing contact at the seat without requiring the very close tolerances and the resulting manufacturing expense and time required to obtain the necessary seal with previous constructions. A specific feature is the accomplishment of this object with a metal-to-metal contact at the seat.

An additional object is to provide a spring-pressed check valve with a guide stem having a non-freezing guideway construction.

These and other objects and advantages of the invention will appear more fully from consideration of the detailed description which follows, in conjunction with the accompanying drawing, wherein one embodiment of the invention is illustrated. It is to be expressly understood, however, that the drawing is for the purposes of illustration and description and is not to be construed as defining the limits of the invention.

Figure 2:
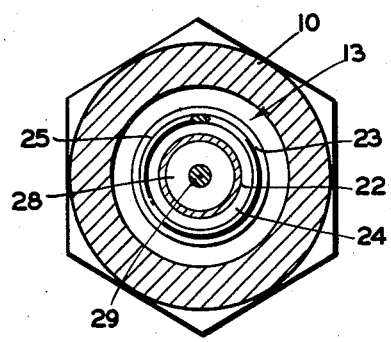

In the drawing:

Fig. 1 is a longitudinal central section through a valve embodying the invention; and Fig. 2 is a transverse section on line 2—2 of Fig. 1.

The illustrated embodiment includes a cylindrical body 10 having an axial threaded extension 11 surrounding an inlet passage 12. At the junction between said passage and the central valve chamber 13, a seat 14 is formed on body 10 having a frusto-conical face 15. The other end of chamber 13 is threaded to receive a plug 16 having a hexagonal flange 17 bearing against a gasket 18 sealing the junction between said plug and body. Plug 16 is provided with a threaded extension 19 surrounding an outlet passage 20 coaxial with and advantageously of the same diameter as inlet passage 12.

A valve-supporting extension or partition 21 in plug 16 extends across the inner end of passage 20, and carries an axial guide cylinder 22 around which a helical compression spring 23 is fitted and seated against partition 21. The other end of spring 23 fits around a cylindrical boss 24 on valve head 25, bearing against a flat annular shoulder 26 on said head adjacent to its margin. Head 25 is provided with an axially convex lower face 27, preferably spherical in contour, which bears against the frusto-conical face 15 of the valve seat, in an axially limited zone intermediate the upper and lower margins of said seat face.

Valve head 25 is also provided with an axial tapering stud 28, preferably frusto-conical in contour, the base of which is of slightly less diameter than the inner edge of the bottom of guide cylinder 22. An axial valve stem 29 forms a continuation of stud 28, and extends through an annular boss 30 on plug 16 at the inner end of outlet passage 20. Boss 30 advantageously tapers radially inwardly to a very narrow inner margin 31 substantially spaced from and normally out of contact with stem 29. Outlet passage 20 and chamber 13 are connected through passages 32 extending diagonally outside of boss 30 and cylinder 22.

With this arrangement, when the pressure in inlet passage 12 is sufficient to overcome the pressure of spring 23, the fluid will unseat valve head 25 and flow through chamber 13 and passages 32 into outlet passages 20, the general operation being the same as that of other check valves. As valve head 25 is thus lifted, it is held in general axial alignment only by the symmetrical pressure of spring 23; and in case of minor deviations it will be centered by the action of cylinder 22 on the tapering stud 28 as the valve head moves into full open position, bearing against the end of said cylinder. In case of violent disturbance in the valve, such as that caused by a turbulent flow, the boss 30 will engage stem 29 sufficiently to prevent sufficient deflection of valve head 25 to interfere with its proper seating; but under normal operation, there will be no contact with the valve stem 29 and boss 30.

With the indicated construction, it will not be necessary to employ the very close tolerances required with other valves, since the seating of valve head 25 on seat 14 will not be affected by slight axial deviation. Moreover, the valve is especially designed to prevent sticking by the freezing of moisture on contacting surfaces. By providing a clearance between boss 30 and valve stem 29, and by constructing the boss with a very narrow face adjacent to said stem, the danger of interference with valve operations or ice at this point is eliminated. With reference to ice formation between the valve head 25 and seat 14, the almost linear contact between the convex face 27 of said head and frusto-conical surface 15 of the seat 14 will prevent the formation of ice bridging the gap between these elements for any substantial distance from the line of contact, since the space between the contiguous surfaces steadily widens on either side of said line. Moreover, the stress on any ice forming in this region is tensile and not a shear stress, so that ice at that point can readily be broken by a very slight rise in inlet pressure above the normal opening valve.

The described construction is compact, symmetrical and readily manufactured from a limited number of parts by standard operations. Plug 16, with boss 30 and cylinder 22, is advantageously formed integrally from suitable metal, as is the body 10, the construction being adapted for, though not limited to, the use of brass. The pressure of spring 23, and the clearance of the valve when opened, may be varied by using gaskets 28 of different thicknesses.

This check valve has been particularly designed for use in oxygen supply systems where the gaseous oxygen flowing to the valve may be at temperatures well below the freezing point of water, and the valve may be used in high altitude aircraft where the circumambient temperature is below such freezing point. In such uses, moisture is often present in the valve chamber and passages, and has a tendency to freeze; and failure of the check valve to open under these conditions in systems of this type may have very serious effects. The described valve has been found highly efficient in operating reliably under icing conditions in this type of installation.

Although but one embodiment of the invention has been illustrated and described in detail, it is to be expressly understood that the invention is not limited thereto. Various changes can be made in the design and arrangement of the parts without departing from the spirit and scope of the invention, as the same will be understood by those skilled in the art.

I claim:

A valve comprising a body, a seat on the body having a frusto-conical face, an associated valve head having at one side an axially convex face contacting the seat face in a zone spaced from the margins of said seat face, an annular spring seat at the opposite side of the valve head, a helical compression spring engaging the spring seat and body, arranged to bias the head against the seat face, a tapering aligning member extending axially from the head on the other side, and an aligning abutment on the body normally in line with the base of the tapering member positioned, to engage said member when the valve head is lifted from the seat face, the valve head in seated position being spaced from the body except at said seat face.

References Cited in the file of this patent

UNITED STATES PATENTS

| | | |
|---|---|---|
| 521,530 | Wall | June 19, 1894 |
| 1,183,941 | Willoughby | May 23, 1916 |
| 1,576,269 | Durant | Mar. 9, 1926 |
| 1,767,538 | Mahan | June 24, 1930 |
| 1,942,417 | Ferlin | Jan. 9, 1934 |
| 1,994,770 | King | Mar. 19, 1935 |
| 2,028,693 | Sharp | Jan. 21, 1936 |
| 2,521,961 | Bacheller | Sept. 12, 1950 |
| 2,524,951 | Ashton | Oct. 10, 1950 |
| 2,619,115 | Dondero | Nov. 25, 1952 |
| 2,699,179 | Hansen | Jan. 11, 1955 |